United States Patent
Flaum et al.

(10) Patent No.: US 10,086,838 B2
(45) Date of Patent: Oct. 2, 2018

(54) METHOD FOR ACTUATING ELECTRIC MOTORS IN SERIAL HYBRID VEHICLES OR FULLY ELECTRIC VEHICLES HAVING AT LEAST TWO SEPARATELY DRIVEN AXLES

(71) Applicant: WABCO GmbH, Hannover (DE)

(72) Inventors: Nikolai Flaum, Hannover (DE); Torsten Wallbaum, Duingen (DE)

(73) Assignee: WABCO GmbH, Hannover (DE)

( * ) Notice: Subject to any disclaimer, the term of this patent is extended or adjusted under 35 U.S.C. 154(b) by 33 days.

(21) Appl. No.: 15/118,101

(22) PCT Filed: Feb. 21, 2015

(86) PCT No.: PCT/DE2015/000395
§ 371 (c)(1),
(2) Date: Aug. 11, 2016

(87) PCT Pub. No.: WO2015/135627
PCT Pub. Date: Sep. 17, 2015

(65) Prior Publication Data
US 2017/0166212 A1    Jun. 15, 2017

(30) Foreign Application Priority Data

Mar. 11, 2014  (DE) .................. 10 2014 003 437
Jan. 8, 2015   (DE) .................. 10 2015 000 216

(51) Int. Cl.
*B60W 30/18*     (2012.01)
*B60W 10/12*     (2012.01)
(Continued)

(52) U.S. Cl.
CPC ......... *B60W 30/18181* (2013.01); *B60K 1/00* (2013.01); *B60K 7/0007* (2013.01);
(Continued)

(58) Field of Classification Search
None
See application file for complete search history.

(56) References Cited

U.S. PATENT DOCUMENTS

| 5,839,535 A | 11/1998 | Arai |
| 6,383,114 B1 | 5/2002 | Hoshiya et al. |

(Continued)

FOREIGN PATENT DOCUMENTS

| DE | 19616582 A1 | 11/1996 |
| DE | 19602170 A1 | 7/1997 |

(Continued)

*Primary Examiner* — Mussa A Shaawat
*Assistant Examiner* — Kyung J Kim
(74) *Attorney, Agent, or Firm* — Leydig, Voit & Mayer, Ltd.

(57) ABSTRACT

A method includes ascertaining a first drive force and a second drive force for a first drive axle and a second drive axle of a vehicle, ascertaining a first slip value and a second slip value for the first drive axle and the second drive axle of the vehicle, determining a first slip measured value for the first drive axle from the first drive force and the first slip value and determining a second slip measured value for the second drive axle from the second drive force and the second slip value, determining a total torque that is to act altogether on the first drive axle and the second drive axle, and dividing the total torque into a first desired torque and a second desired torque in dependence upon the first slip measured value and the second slip measured value.

18 Claims, 4 Drawing Sheets

(51) Int. Cl.
  *B60W 10/22* (2006.01)
  *B60W 20/15* (2016.01)
  *B60K 1/00* (2006.01)
  *B60K 7/00* (2006.01)
  *B60K 17/354* (2006.01)
  *B60K 17/356* (2006.01)

(52) U.S. Cl.
  CPC .......... *B60K 17/354* (2013.01); *B60K 17/356* (2013.01); *B60W 10/12* (2013.01); *B60W 10/22* (2013.01); *B60W 20/15* (2016.01); *B60K 2001/001* (2013.01); *B60W 2300/10* (2013.01); *B60W 2300/13* (2013.01); *B60W 2510/22* (2013.01); *B60W 2520/26* (2013.01); *B60W 2520/40* (2013.01); *B60W 2720/40* (2013.01); *B60W 2720/403* (2013.01); *Y02T 10/7258* (2013.01); *Y10S 903/902* (2013.01)

(56) References Cited

U.S. PATENT DOCUMENTS

| | | |
|---|---|---|
| 6,497,333 B1 | 12/2002 | Ellis et al. |
| 6,549,840 B1 | 4/2003 | Mikami et al. |
| 2001/0025219 A1 | 9/2001 | Ohba et al. |
| 2003/0051554 A1 | 3/2003 | Stiller |
| 2011/0125382 A1 | 5/2011 | Bonfigt et al. |
| 2011/0166735 A1 | 7/2011 | Kustosch |
| 2011/0287888 A1 | 11/2011 | Muller et al. |
| 2012/0265386 A1 | 10/2012 | Rauner et al. |
| 2013/0179017 A1* | 7/2013 | Bartels ................ B60W 10/188 701/22 |
| 2013/0211640 A1 | 8/2013 | Maier et al. |
| 2013/0313033 A1 | 11/2013 | Elliott |
| 2014/0018987 A1* | 1/2014 | Kato ....................... B60T 8/175 701/22 |
| 2014/0121870 A1 | 5/2014 | Lee |

FOREIGN PATENT DOCUMENTS

| | | |
|---|---|---|
| DE | 10049514 B4 | 7/2001 |
| DE | 10049567 A1 | 10/2001 |
| DE | 10017506 C2 | 1/2002 |
| DE | 102008042228 A1 | 4/2010 |
| DE | 102008043849 A1 | 5/2010 |
| DE | 102010015423 A1 | 10/2011 |
| DE | 102010036859 A1 | 2/2012 |
| DE | 102011001994 A1 | 10/2012 |
| EP | 2327596 A1 | 6/2011 |
| EP | 2432670 B1 | 3/2012 |
| JP | 0680047 A | 3/1994 |
| JP | 2001260836 A | 9/2001 |
| JP | 2014087251 A | 5/2014 |
| JP | 5096637 B | 7/2014 |
| WO | WO 2012111160 A1 | 8/2012 |

* cited by examiner

METHOD FOR ACTUATING ELECTRIC MOTORS IN SERIAL HYBRID VEHICLES OR FULLY ELECTRIC VEHICLES HAVING AT LEAST TWO SEPARATELY DRIVEN AXLES

CROSS REFERENCE TO RELATED APPLICATIONS

This application is a U.S. National Stage Application under 35 U.S.C. § 371 of International Application No. PCT/EP2015/000395, filed on Feb. 21, 2015, and claims benefit to German Patent Application Nos. DE 10 2014 003 437.2, filed on Mar. 11, 2014, and DE 10 2015 000 216.3, filed on Jan. 8, 2015. The International Application was published in German on Sep. 17, 2015 as WO 2015/135627 A1 under PCT Article 21(2).

FIELD

The invention relates to a method for controlling a vehicle, a device for controlling a vehicle, and a vehicle.

BACKGROUND

In the case of vehicles having multiple drive axles, in particular in the case of hybrid vehicles that are driven in a serial manner or fully electrically driven vehicles, it is desirable on the one hand to provide an operating or driving strategy that is optimal in terms of consumption and on the other hand to provide an operating or driving strategy that is optimal in terms of acceleration for the vehicle, in particular when accelerating and braking the vehicle. As a consequence, an optimized energy demand and an optimized traction would be ensured in the case of a long serviceable life of the vehicle and the tires of said vehicle.

There is therefore desirable to operate a vehicle in an efficient manner with an optimal consumption and optimal acceleration. In particular, it is desirable to provide a method and a device with which it is rendered possible to distribute a predetermined drive force or drive torque, in particular a predetermined torque, between the multiple drive wheels or drive axles so that an optimal transmission of force is ensured from the vehicle to the ground (road). Various methods for controlling vehicles for this purpose are known from the prior art.

The document DE 10 2011 001 994 A1 discloses a method for operating a hybrid vehicle having multiple driven axles. The known vehicle comprises a first drive axle that is driven in an electrical manner by a first electric motor and a second drive axle that is driven in an electrical manner by a second electric motor and/or an internal combustion engine. In the case of the known method, during a driving cycle of the vehicle, the driving performance and/or a variable of the vehicle that represents the driving performance is determined. An operating strategy is then determined from this variable for the next, new driving cycle of the vehicle on the basis of the driving performance or the variable of the preceding driving cycle, said variable representing the driving performance.

The document DE 100 49 567 A1 describes a control device for controlling an all-wheel drive motor vehicle. The known motor vehicle comprises a first drive source for driving a first pair of front wheels and a pair of rear wheels, and also a second drive source for driving another pair of front and rear wheels. It is possible with the known method or known vehicle control device to provide a front drive force to drive the front wheels and a rear drive force to drive the rear wheels.

The publication DE 100 49 514 B4 also describes a vehicle regulating device for controlling a hybrid vehicle. The hybrid vehicle comprises a first drive source and a second drive source and also a force transmission system having a gear mechanism and a planetary gear.

The document DE 196 02 170 A1 relates to a method for determining road conditions by means of a brake pressure regulating method. The document EP 2 432 670 B1 also relates to a method for controlling a braking system of a vehicle, wherein the vehicle comprises a motor, a service brake and a holding brake. The two above-mentioned documents describe in each case in an exemplary manner a method for determining a slip for a vehicle.

SUMMARY

In an embodiment the present invention provides a method for controlling a vehicle, the vehicle having at least a first drive axle and a second drive axle, wherein the first drive axle is allocated a first drive device and the second drive axle is allocated a second drive device and when operating the first drive device and the second drive device, a first slip and a second slip are present, in the case of a first drive force and a second drive force that act upon the first and the second drive axle. The method includes ascertaining the first drive force and the second drive force for the first drive axle and the second drive axle of the vehicle, ascertaining the first slip value and the second slip value for the first drive axle and the second drive axle of the vehicle, determining a first slip measured value for the first drive axle from the first drive force and the first slip value and determining a second slip measured value for the second drive axle from the second drive force and the second slip value, predetermining a total torque that is to act altogether on the first drive axle and the second drive axle, and dividing the total torque into a first desired torque and a second desired torque in dependence upon the first slip measured value and the second slip measured value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
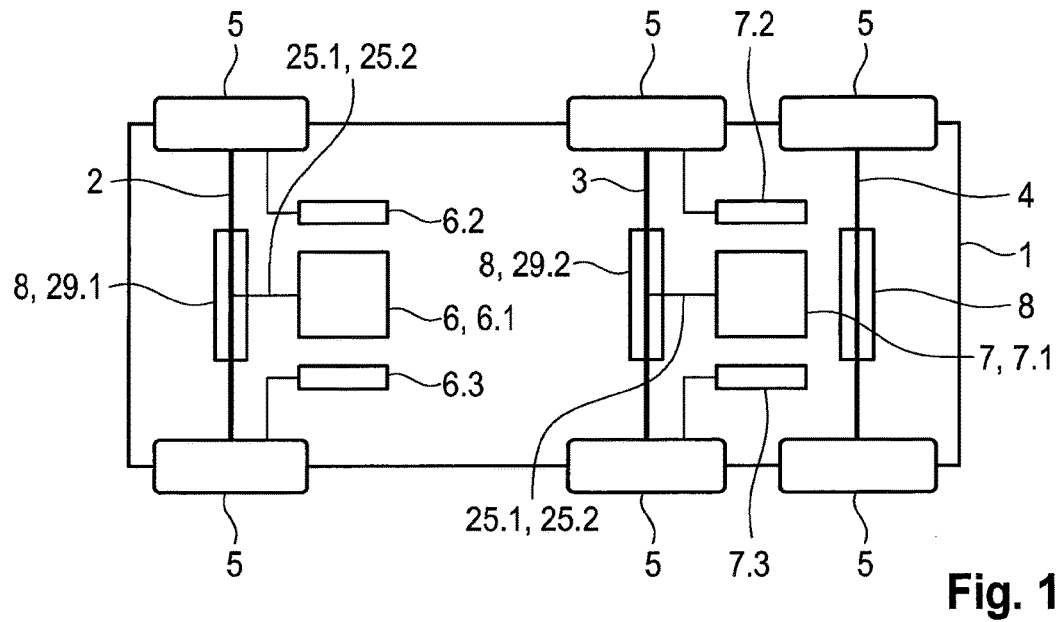
FIG. 1 illustrates schematically a vehicle in accordance with an embodiment of the invention.

An embodiment of the invention provides an improved method and an improved device for controlling a vehicle, said method and device rendering it possible to distribute a total torque to multiple drive axles so that the slip of the vehicle, in particular a difference slip, is minimized.

An embodiment of the invention provides a method for controlling a vehicle having at least a first and a second drive axle, wherein the first drive axle is allocated a first drive device and a second drive axle is allocated a second drive device and when operating the first and second drive device, a first and second slip are present, in the case of a first and second drive force that act upon the first and second drive axle, wherein the method comprises the following steps:

- Ascertaining the first and the second drive force for the first and the second drive axle of the vehicle;
- Ascertaining the first and the second slip value for the first and second drive axle of the vehicle;
- Determining a first slip measured value for the first drive axle from the first drive force and the first slip value and determining a second slip measured value for the second drive axle from the second drive force and the second slip value;
- Predetermining a total torque that is to act altogether on the first and second drive axle; and
- Dividing the total torque into a first and second desired torque in dependence upon the first and the second slip measured value.

Furthermore, an embodiment of the invention provides a device for controlling a vehicle, in particular embodied so as to implement the method in accordance with the invention, having at least one first and one second drive axle, wherein the first drive axle is allocated a first drive device and the second drive axle is allocated a second drive device and, when operating the first and second drive device, a first and second slip are present in the case of a first and second drive force that act upon the first and second drive axle, wherein the device comprises the following features:

- Means for ascertaining the first and second drive force for the first and second drive axle of the vehicle;
- Means for ascertaining the first and second slip value for the first and the second drive axle of the vehicle;
- An evaluating module for determining a first slip measured value for the first drive axle from the first drive force and the first slip value and determining a second slip measured value for the second drive axle from the second drive force and the second slip value;
- Means for predetermining a total torque that is to act altogether on the first and second drive axle; and
- A control module for dividing the total torque into a first and second desired torque in dependence upon the first and second slip measured value.

Furthermore, the invention relates to a vehicle including a device in accordance with the invention.

A method in accordance with an embodiment of the invention and a device in accordance with an embodiment of the invention are used so as to control a vehicle having two drive axles, in particular a hybrid vehicle that is driven in a serial manner, by way of example an omnibus. In accordance with the concept of the invention, initially a first and second drive force and a first and a second slip value for the first and second drive axle of the vehicle are ascertained. The slip value describes the deviation from the stretch of road that is currently being covered by the vehicle per wheel rotation and the wheel circumference of a wheel of the vehicle. A slip occurs in particular owing to the wheels spinning or being blocked when driving with the vehicle, in particular when accelerating or braking. The drive force indicates the force that acts upon a drive axle. A first and a second slip measured value are subsequently determined for the first and second drive axle from the values for the drive forces and the slip values. The slip measured value is defined as the change in the slip ( )) in relation to the change in the drive force (dF) and can be calculated in accordance with the following formula:

$$FK_n = f\left(\frac{d\lambda}{dF}\right).$$

By way of example a ratio, in particular a first and a second ratio value, is then determined from the determined first and second slip measured value. Furthermore, a total torque is predetermined for the vehicle, for example by means of actuating a braking value encoder or a gas pedal by means of a driver of the vehicle. The total torque indicates the torque that is to act altogether on (all) drive axles, in particular on the first and second drive axle. The total torque is subsequently divided into a first and a second desired torque, by way of example in accordance with the determined ratio, in particular in accordance with the first and second ratio value. The first and second desired torque is then applied to the first and second drive axle or is to act upon said first and second drive axle.

The vehicle stability of the vehicle during the driving operation is improved and the wear of the tires of the drive axles is minimized and/or simultaneously distributed to the drive axles when using the method in accordance with the invention and the device in accordance with the invention for controlling a vehicle, in particular by means of controlling the drive axles or drive devices of the vehicle in a slip-regulated manner. In addition, with the method in accordance with the invention, when accelerating and/or decelerating the vehicle, an improved traction is provided. In addition, when braking the vehicle, the extent of recuperation is increased.

The drive force of a vehicle can be determined by way of example by way of the change in the vehicle velocity, wherein the vehicle velocity can be determined by way of example by way of ascertaining the wheel rotational speed of a wheel of the vehicle of the driven and/or the non-driven axles. The vehicle velocity can also be ascertained by means of a global positioning system (GPS) signal. The vehicle velocity can preferably be ascertained for each axle, each side and/or each wheel.

It is preferred that one embodiment provides that the method additionally comprises the following steps: namely determining a ratio value from the first and second slip measured value for the first and second drive axle; and distributing the total torque into the first and the second desired torque in dependence upon the determined ratio value. It is preferably provided that a ratio or a first and second ratio value is determined for the first and second drive axle from the determined first and second slip measured value. The total torque is subsequently divided in accordance with the ratio, in particular in accordance with a first and second ratio value into the first and second desired torque.

In the case of an expedient embodiment, it can be provided that the method additionally comprises the following steps: namely predetermining a radius of at least one wheel of the vehicle; predetermining a first and second slip threshold for the first and second drive axle; and determining a first torque threshold for the first drive axle and a second torque threshold for the second drive axle by means of the first and second slip measured value, the first slip threshold and the second slip threshold and the at least one radius of the wheel. In the case of this embodiment, it is provided that on the one hand a semidiameter or radius of at least one wheel of the vehicle is predetermined and on the other hand a first and second slip threshold is predetermined for the first and second drive axle. A first torque threshold for the first drive axle and a second torque threshold for the second drive axle are determined from these values of semidiameter or radius and the slip threshold. The semidiameter or radius of the wheels or tires of the vehicle are inter alia dependent upon the air pressure in the tires, the velocity of the vehicle and/or the extent of wear of the tires. The prevailing value for the radius of each tire of the vehicle is continuously determined and can be drawn upon to calculate the torque threshold for the respective drive axle.

A preferred further development provides that the method additionally comprises the following step, namely of controlling the first and second drive device so that the first desired torque acts upon the first drive axle and second desired torque acts upon the second drive axle, wherein the first desired torque is not greater than the first torque threshold and the second desired torque is not greater than the second torque for the respective first or second drive axle. It is preferably provided that the torques that are determined beforehand are used as control values when controlling the respective drive devices for the respective drive axles, wherein the drive axles are influenced with the respective desired torques in such a manner that the desired torques are always less than the in each case associated determined torque thresholds, in particular the desired torque that acts upon the first drive axle is less than the first torque threshold, and the second desired torque that acts upon the second drive axle is less than the second torque threshold. It is in other words provided that the desired torques are continuously compared to the torque thresholds. As soon as a desired torque achieves the corresponding torque threshold or has exceeded said torque threshold, the desired torque is reduced so that the resulting (desired) torque returns to the desired range. As a consequence, it is always ensured that a specific (predetermined) slip threshold is not exceeded at the first and/or second drive axle.

In the case of an advantageous embodiment, it can be provided that the first drive device is embodied as a first axle drive device that acts upon the first axle or as two first wheel drive devices that act independently of one another on the wheels of the first axle and the second drive device is embodied as a second axle drive device that acts upon the second axle or as two second wheel drive devices that act independently of one another on the wheels of the second axle. In the case of this embodiment, either two axle drive devices are provided for in each case one drive axle or altogether four wheel drive devices are provided for each wheel of a drive axle, in particular the first and second drive axle.

A preferred further development provides that the first and/or second axle drive device and/or the first and second wheel drive devices are embodied as a first and/or second electric motor.

A further development can provide that the first and/or second drive device effect both the acceleration torque as well as the deceleration torque on the first and/or second drive axle. It is provided in an advantageous manner that the method can not only be implemented when accelerating but rather also when braking a vehicle. In particular, when braking the vehicle, the movement energy can be recuperated as electrical energy, wherein the drive devices, in particular the electric motors, can then be operated as generators.

It is preferred that one embodiment provides that the vehicle preferably comprises an electronically regulated air suspension so as to ascertain an axle load distribution, in particular of a first and second axle load value for the first and second drive axle. It is preferably provided to determine the axle load distribution of the vehicle by means of an electronically regulated air suspension system, in particular a first and second axle load value for the first and second drive axle. These values can be used to determine a ratio or a ratio value for the division of the total torque into the corresponding desired torques that in each case are to be applied to the respective drive axles, in particular for the first and second drive axle. This has the advantage that even prior to commencing travel with the vehicle an optimized torque distribution is present so that an optimized traction is already present for accelerating the vehicle when setting off with the vehicle.

A preferred embodiment relates to a method that is performed prior to commencing travel and/or in the case of a driving operation of the vehicle. By virtue of implementing the method prior to commencing travel with the vehicle, the advantage is achieved that an optimized traction is already present when setting off with the vehicle. The implementation of the method during the driving operation renders possible a continuous adjustment of the desired torques in the case of the driving operation so that an optimal acceleration and/or deceleration of the vehicle is/are present at each point in time.

One advantageous embodiment relates to a method that is repeated during the driving operation of the vehicle. The method is continuously repeated in an advantageous manner so that it is possible to continuously adjust the determined desired torques for the multiple drive axles.

A particularly advantageous embodiment relates to a vehicle, in particular a hybrid vehicle and further preferred an omnibus. In particular, omnibuses are subjected to intense fluctuations in the axle load distribution, for example as a result of a continuous change in the passenger distribution in the bus. The above described advantages in accordance with the invention, in particular the minimized difference slip between the multiple drive axles and optimal fuel consumption are particularly relevant in hybrid vehicles, in particular in the case of omnibuses.

It is preferred that one embodiment provides that the method additionally comprises the following steps: namely ascertaining a first and second maximum torque that can be implemented by the first drive device and/or the second drive device.

In the case of an expedient embodiment, it can be provided that the vehicle does not additionally comprise a further, non-driven axle. In the case of this embodiment, the vehicle comprises at least one further axle. However, it is also possible without being limiting to transfer the present method to vehicles having more than two drive axles. Each additional drive axle is then embodied in a manner comparable to the first drive axle and/or second drive axle.

A preferred further development provides that the total torque is predetermined by means of a braking value encoder or a gas pedal of the vehicle or by means of any other external demand for acceleration or deceleration or a manual operating element.

FIG. 1 illustrates schematically a vehicle (from below) in accordance with one possible embodiment of the invention. The vehicle 1 that is illustrated comprises altogether three axles, namely a first and second drive axle 2, 3 and also a non-driven third axle 4. However, it is also possible without being limiting to transfer the method and device that are claimed in this application to vehicles that comprise more or fewer drive axles and/or more or fewer non-driven axles.

In the present illustrated case, the first and second drive axle 2, 3 are allocated in each case a drive device; in particular the first drive axle 2 is allocated a first drive device 6 and the second drive axle 3 is allocated a second drive device 7. The first and second drive device 6,7 are preferably embodied as axle drive devices 6.1, 7.1 (illustrated schematically); said drive devices are configured in each case so as to cause a torque on the first and second drive axle 2, 3. It can be both an acceleration torque 25.1 as well as a deceleration torque 25.2. It is preferred that the first and second drive device 6, 7, in particular the first and the second drive device 6.1, 7.1, are embodied as a first electric motor and a second electric motor.

In another preferred embodiment (not illustrated), the first drive device 6 is embodied in the form of two wheel drive devices 6.2, 6.3 (illustrated schematically) that act independently of one another, said wheel drive devices being configured in each case to cause a corresponding torque on an accordingly allocated wheel of the first drive axle 2. The second drive device 7 is also embodied in the case of this embodiment in the form of two drive devices 7.2, 7.3 that act independently of one another, said drive devices being configured in each case so as to cause a torque, in particular an acceleration torque 25.1 and/or a decelerating torque 25.2, on the accordingly allocated wheels 5 of the second drive axle 3. In a preferred embodiment, the first and second wheel drive devices 6.1, 6.2, 7.1 and 7.2 are embodied as electric motors.

Furthermore, the vehicle 1 comprises an air suspension system 8 (only illustrated schematically) that is configured so as to determine an axle load distribution of the vehicle, in particular a first axle load value 29.1 for the first drive axle 2 and a second axle load value 29.2 for the second drive axle 3 and a further axle load value for the non-driven axle 4 and to relay said axle load distribution value to a vehicle controlling device (not illustrated). It is preferred that the air suspension system 8 is an electronically regulated air suspension system.

Figure 2A:
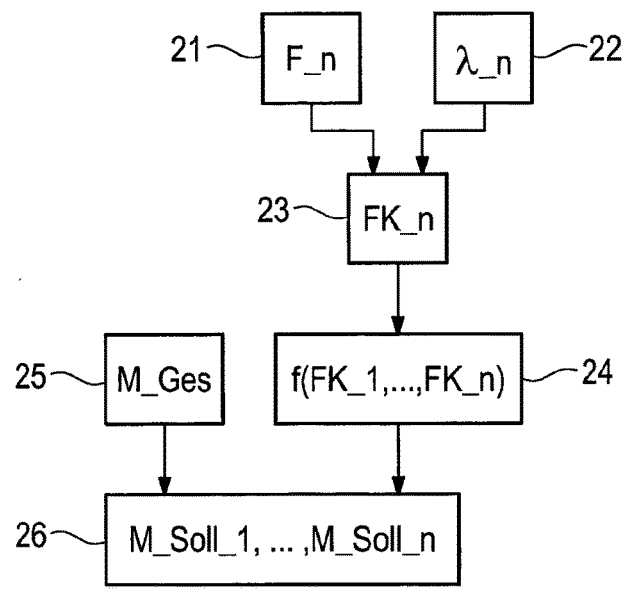
FIG. 2A illustrates schematically a flow diagram of a method in accordance with an embodiment of the invention.

FIG. 2A illustrates a schematic method diagram in accordance with a possible embodiment of the method in accordance with the invention for controlling a vehicle 1 having multiple, namely n drive axles, preferably however having a first and second drive axle 2, 3, in other words n=2 drive axles of the vehicle. The method illustrated in FIG. 2A is one possible embodiment for a method for controlling a vehicle 1, as is illustrated by way of example in FIG. 1, wherein identical reference numerals are used for identical features.

Initially, in the case of this embodiment the multiple drive forces F_1 to F_n for the first to the n-th drive axle of the vehicle 1 are ascertained at the multiple drive axles (cf. reference numeral 21 in FIG. 2A). In addition, for the first to the n-th drive axle, a first to the n-th slip, namely $\lambda\_1$ to $\lambda\_n$ for the first to the n-th drive axle, is ascertained 22, in particular a first and a second slip value $\lambda\_1$, $\lambda\_2$ for the first and second drive axle 2, 3 of the vehicle 1, as is illustrated by way of example in FIG. 1. The values for the drive forces F_1 to F_n and the first to n-th slip values $\lambda\_1$ to $\lambda\_n$ can then be used to determine 23 a corresponding slip measured value FK_n (for the n-th drive axle) for each drive axle, in particular however for the first and second drive axle 2, 3, in other words a first slip measured value FK_1 for the first drive axle 2 from the value for the first drive force F_1 and the first slip measured value $\lambda\_1$ and a slip measured value FK_2 for the second drive axle 3 from the value for the second drive force F_2 and the second slip measured value $\lambda\_2$. The slip measured value is defined as the change in the slip $d\lambda$ in relation to the change in the drive force dF and can be calculated in accordance with the following formula:

$$FK_n = f\left(\frac{d\lambda\_n}{dF\_n}\right)$$

It is then possible to determine 24 ratios or ratio values VW_1 to VW_n, preferably for example VW_1=FK_1/FK_2 and VW_2=FK_2/FK_1 from the determined slip measured values FK_1 to FK_n for the first to the n-th drive axle.

In addition, a total torque M_Ges is predetermined 25, for example by means of a braking value encoder 36.1 or a gas pedal 36.2 of the vehicle 1 or by means of any other external demand for acceleration or deceleration 36.3 or however by means of a manual operating element 36.4 in the vehicle 1. The total torque M_Ges indicates the torque that is to act altogether on the drive axles, in particular on the first and second drive axle 2, 3. The total torque M_Ges can be both an acceleration torque as well as a deceleration torque. The total torque M_Ges is then divided 26 in accordance with the determined ratio or the ratio values into multiple desired torques M_Soll_1 to M_Soll_n for the first to the n-th drive axle, in particular into a first desired torque M_Soll_1 and a second desired torque M_Soll_2 that are then to be applied to the first and second drive axle or are to act thereupon.

Figure 2B:
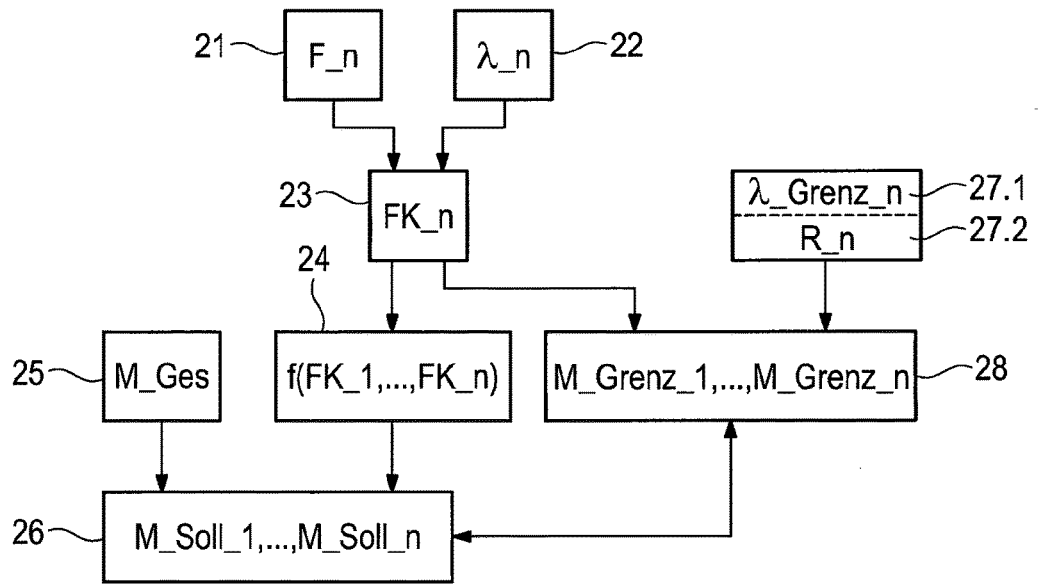
FIG. 2B illustrates schematically a flow diagram of another method in accordance with an embodiment of the invention.

FIG. 2B illustrates a schematic method diagram in accordance with a possible embodiment of the method in accordance with the invention for controlling a vehicle 1 having multiple, namely n, drive axles, in particular having a first and second drive axle 2, 3, as is illustrated in FIG. 1. The possible embodiment that is illustrated in FIG. 2B corresponds essentially to the method as is described in FIG. 2A, wherein multiple method steps are provided.

In the case of the method that is illustrated in FIG. 2B, on the one hand a semidiameter or radius R of at least one wheel of the vehicle is predetermined 27.2 and on the other hand multiple slip threshold values $\lambda\_Grenz\_1$ to $\lambda\_Grenz\_n$ for the first to the n-th drive axle 27.1, in particular a slip threshold $\lambda\_Grenz\_1$, $\lambda\_Grenz\_2$ for the first and second drive axle 2, 3, are predetermined. The respective values of semidiameter or radius R and the slip threshold are used to determine 28 a torque threshold M_Grenz_1 to M_Grenz_n for the first to the n-th drive axle, in particular a first torque threshold M_Grenz_1 for the first drive axle 2 and a second torque threshold M_Grenz_2 for the second drive axle 3. The torque threshold is determined in accordance with the following formula:

$$M_{grenz\_n} = F_{grenz\_n} * R,$$

wherein:

$$FK_n = \frac{\lambda\_Grenz\_n}{F\_Grenz\_n}$$

The torque thresholds M_Grenz_1 to M-Grenz_n that are determined in this manner are then used as control values when controlling the respective drive devices for the respective drive axles, wherein the drive axles are controlled with the respective desired torques in such a manner that the desired torques M_Soll_1 to M_Soll_n are always to be less than the respective associated determined torque thresholds M_Grenz_1 to M_Grenz_n, in particular however the first desired torque M_Soll_1 that acts upon the first drive axle 2 is less than the first torque threshold M_Grenz_1 and the second desired torque M_Soll_2 that acts upon the second drive axle 3 is less than the second torque threshold. As a consequence, it is always ensured that a specific (predetermined) slip threshold is not exceeded at a specific drive axle.

Figure 2C:
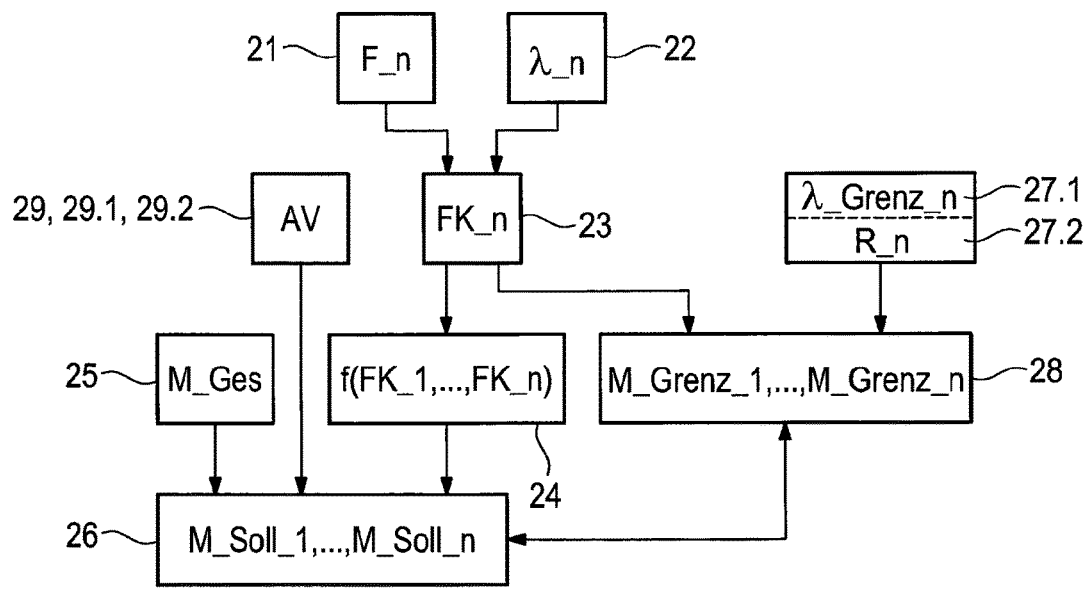
FIG. 2C illustrates schematically a flow diagram of a method in accordance with an embodiment of the invention.

FIG. 2C illustrates a schematic method diagram in accordance with an even more preferred embodiment of the method, as is illustrated and described in FIGS. 2A and 2B, wherein an additional method step is provided, namely ascertaining 29 an axle load distribution AV of the vehicle 1, in particular of a first axle load value 29.1 for the first drive axle and a second axle load value 29.2 for the second drive axle.

The axle load distribution AV of the vehicle 1 can be ascertained or determined by way of example by means of an electronically regulated air suspension system. It is then possible in an advantageous manner, prior to commencing travel with the vehicle to determine a ratio or ratio values for the corresponding desired torques that are to be applied to the respective drive axles, in particular for the first and second drive axle 2, 3 from the axle load distribution of the vehicle, in particular from the axle load values for the respective drive axle. This has the advantage that an optimized torque distribution is present even prior to commencing travel so that when setting off with the vehicle an optimal traction is already present, provided that the friction value between the vehicle and the road is identical and the tire characteristic curves of the axles that are affected are comparable.

Figure 3:
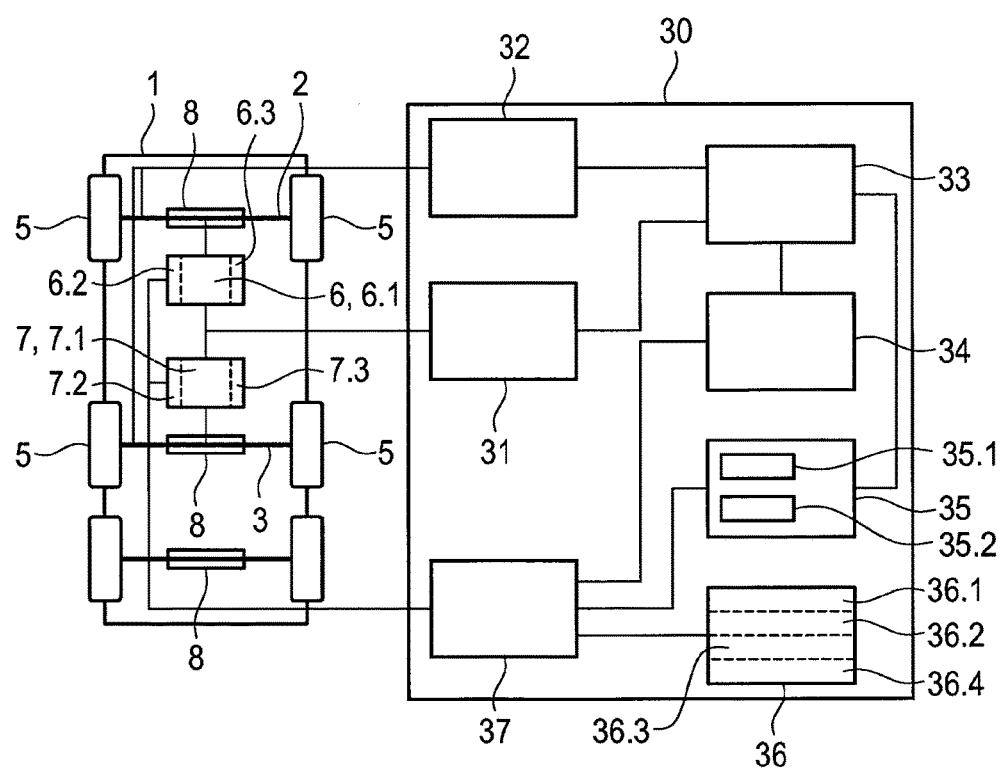
FIG. 3 illustrates schematically a vehicle and a device in accordance with an embodiment of the invention.

FIG. 3 illustrates schematically a vehicle 1 and a device 30 for controlling the vehicle 1 in accordance with an advantageous embodiment of the invention. A vehicle 1 is illustrated having altogether three axles, namely a first and second drive axle 2, 3 and also a non-driven third axle 4. In the present case, each drive axle is allocated a drive device, in particular the first drive axle 2 is allocated a first drive device 6 and the second drive axle 3 is allocated a second drive device 7. Without being limiting reference is made to the description of FIG. 1, where a vehicle of this type is already described. The embodiment that is described in FIG. 3 is however in no way limited to this vehicle; on the contrary the method and the device can also be transferred to vehicles that comprise multiple drive axles and/or more non-driven axles.

Furthermore, FIG. 3 illustrates a device 30 for controlling the vehicle 1, said device being integrated in a preferred manner in the vehicle 1. The device 30 comprises means 31 for ascertaining a first and second drive force F_1, F_2 for the first and second drive axle 2, 3 of the vehicle 1 and means 32 for ascertaining the first and the second slip value $\lambda\_1$, $\lambda\_2$ for the first and second drive axle 2, 3 of the vehicle 1. With the aid of an evaluating module 33, a first slip measured value FK_1 is determined for the first drive axle 2 (from the first drive force F_1 and the first slip value $\lambda\_1$) and a second slip measured value FK_2 is determined for the second drive axle 3 (from the second drive force F_2 and the second slip value $\lambda\_2$) using the in each case two values, namely drive force and slip value for the first and second drive axle 2, 3. In addition, means 36 are provided, in particular a braking value encoder 36.1 and/or a gas pedal 36.2 of a vehicle 1 or by means of any other external demand for acceleration or deceleration 36.3 or a manual operating element 36.4 (illustrated schematically) for ascertaining or predetermining a total torque that is to act altogether on the first and second drive axle 2, 3. The predetermined total torque is divided by means of a control module 34 into a first and second desired torque M_Soll_1, M_Soll_2 in dependence upon the first and second slip measured value FK_1, FK_2 and is relayed to a control module 37, wherein the control module 37 for controlling the drive devices 6, 7 is connected to the drive devices 6, 7 electronically so as to transmit control signals.

Furthermore, a comparison module 35 is provided, wherein the comparison module 35 is embodied by way of example with a first (sub)unit 35.1 and a second (sub)unit 35.2 and the first unit 35.1 predetermines a first slip threshold value $\lambda\_Grenz\_1$ and a second slip threshold value $\lambda\_Grenz\_2$ and the second unit 35.2 predetermines a radius R of at least one wheel 5 of the vehicle 1. The units 35.1 and 35.2 can be embodied by way of example in the form of storage devices in which the respective values are stored. A first torque threshold M_Grenz_1 for the first drive axle 2 and a second torque threshold M_Grenz_2 for the second drive axle 3 is determined from the respective values for semidiameter or radius R and slip threshold. The torque threshold can be determined in accordance with the description for FIG. 2A to 2C. The first and the second desired torque M_Soll_1, M_Soll_2 is compared to the first torque threshold and the second torque threshold using the comparing module 35 that is connected to the control module 37, wherein the drive devices 6, 7 are controlled in such a manner that the first desired torque M_Soll_1 that acts upon the first drive axle 2 and the second desired torque M_Soll_2 that acts upon the second drive axle 3 is not greater than the first torque threshold M_Grenz_1 or the second desired torque M_Soll_2 is not greater than the second torque threshold M_Grenz_2 for the respective first or second drive axle 2, 3. The individual modules of the device 30 are embodied in a preferred embodiment of the device 30 in each case as software modules of a software program for controlling a vehicle.

Figure 4:
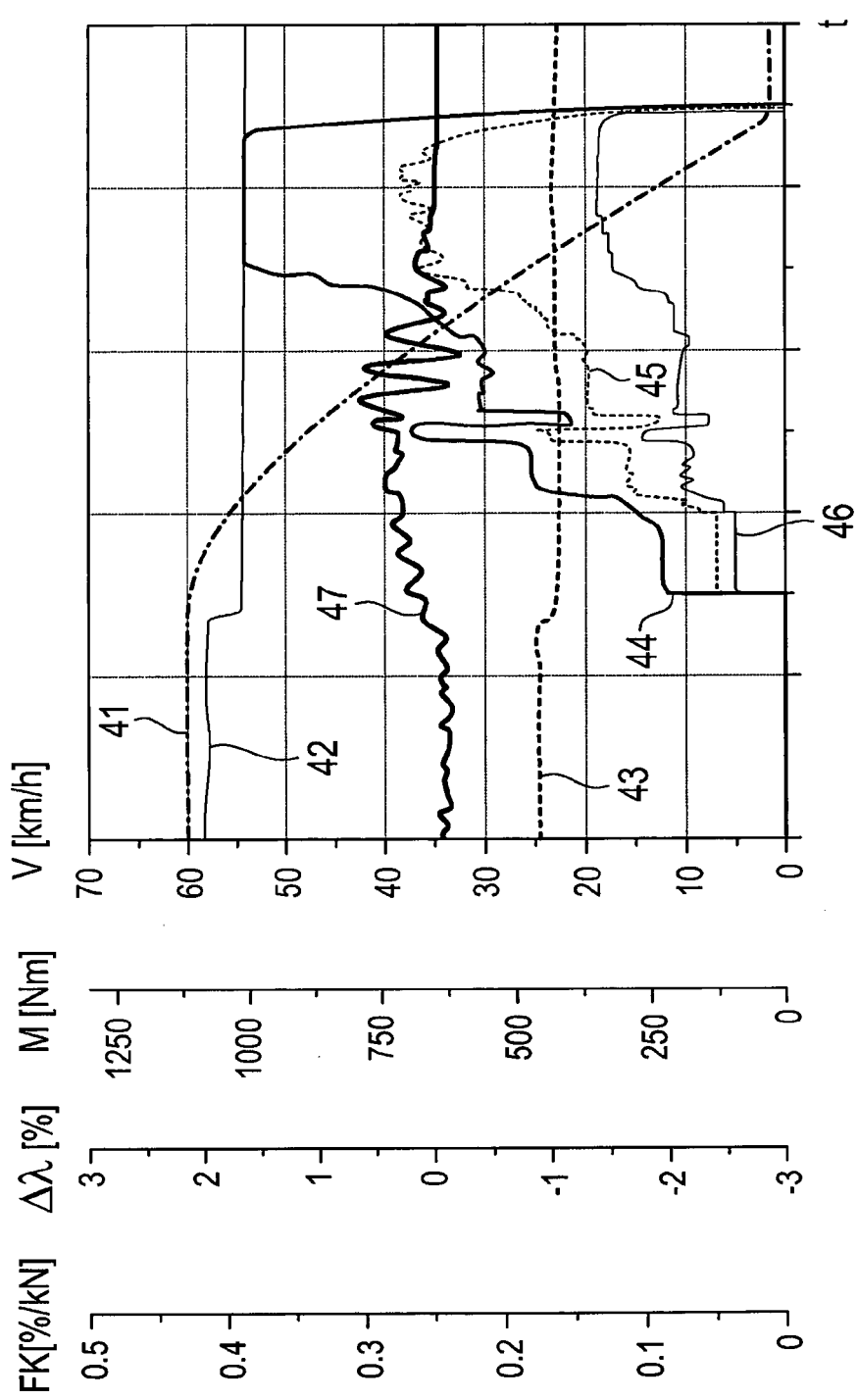
FIG. 4 illustrates a measurement of various measurement variables in the case of a method in accordance with an embodiment of the invention.

FIG. 4 illustrates a measurement of various measuring values, in particular the slip measured value FK, the difference slip $\Delta\lambda$, the torques M_n and the velocity v of the vehicle in the case of implementing the method in accordance with the invention in accordance with a possible embodiment, in particular when performing a braking maneuver.

In the illustrated diagram of the measuring process, in each case the process of measuring the various measured variables is illustrated during a braking procedure of the vehicle, wherein the vehicle is embodied in the present case having multiple drive axles, in particular having two drive axles.

The time t (during the braking maneuver) is illustrated on the x-axis and the various measured variables are illustrated on the y-axis, namely the velocity v of the vehicle, the (braking) torque M, the difference slip $\Delta\lambda$ between the first and second drive axle and the slip measured value FK.

The velocity curve 41 illustrates the temporal velocity characteristics of the vehicle that is braked from a velocity of approx. 60 km/h to 0 km/h. The total torque curve 44 illustrates the temporal characteristics of the total torque during the braking maneuver that is applied or predetermined altogether at the two drive axles of the vehicle.

In accordance with a first and a second slip measured value, in particular a slip measured value curve 42 and 43, the total braking torque, in particular the total torque curve 44, is divided into a first desired torque 45 for the first drive axle and a second desired torque 46 for the second drive axle and is applied at said axles, wherein the sum of the two desired torques 45 and 46 at each point in time corresponds to the value of the total torque curve 44 provided that the two desired torques do not exceed a respective torque threshold.

The difference slip curve 47 illustrates the resulting difference slip of the vehicle between the first and second drive axle during the braking procedure. It illustrates that the difference slip at each point in time is minimized and only deviates slightly from the zero line. As a consequence, an optimal braking procedure is provided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS
(COMPONENT OF THE DESCRIPTION)

1 Vehicle
2 First drive axle
3 Second drive axle
4 Third (non-driven) axle
5 Wheels
6 First drive device
6.1 First axle drive device
6.2, 6.3 First wheel drive device
7 Second drive device
7.1 Second axle drive device
7.2, 7.3 Second wheel drive device
8 Air suspension
21 Ascertaining a drive force
22 Ascertaining a slip
23 Determining a slip measured value
24 Forming a ratio value
25 Predetermining a total torque
25.1 Acceleration torque
25.2 Deceleration torque
26 Dividing the total torque
27.1 Predetermining a slip threshold
27.2 Predetermining a radius
28 Determining the torque threshold
29 Predetermining an axle load distribution
29.1 First axle load value
29.2 Second axle load value
30 Device
31 Means for ascertaining the force
32 Means for ascertaining the slip values
33 Evaluating module
34 Control module
35 Comparing module for determining the torque thresholds
35.1 First unit
35.2 Second unit
36 Means for predetermining a total torque
36.1 Braking value encoder
36.2 Gas pedal
36.3 External demand for acceleration or deceleration
36.4 Manual operating element
37 Control module
41 Velocity curve
42 First slip measured value curve
43 Second slip measured value curve
44 Total torque curve
45 Desired torque curve for the first drive axle
46 Desired torque curve for the second drive axle
47 Difference slip curve
$F\_n$ Drive force
$\lambda$ Slip value
FK Slip measured value
$FK\_1$ First slip measured value
$FK\_2$ Second slip measured value
$M\_Ges$ Total torque
$M\_Soll$ Desired torque
$M\_Soll\_1$ First desired torque
$M\_Soll\_2$ Second desired torque
$M\_Grenz$ Torque threshold
$M\_Grenz\_1$ First torque threshold
$M\_Grenz\_2$ Second torque threshold
AV Axle load distribution
R Radius
$\lambda\_Grenz$ Slip threshold
$\Delta\lambda$ Difference slip
v Velocity
t Time

The invention claimed is:

1. A method for controlling a vehicle having a first drive device allocated to a first drive axle and a second drive device allocated to a second drive axle, the method comprising:

ascertaining a first drive force that acts upon the first drive axle and a second drive force that acts upon the second drive axle;

ascertaining a first slip value for the first drive axle and a second slip value for the second drive axle;

determining, from the first drive force and the first slip value, a first slip measured value for the first drive axle determining, from the second drive force and the second slip value, a second slip measured value for the second drive axle;

determining a total torque that is to act altogether on the first drive axle and the second drive axle;

dividing, in dependence upon the first slip measured value and the second slip measured value, the total torque into a first desired torque and a second desired torque; and applying, by the first drive device to the first drive axle, the first desired torque and applying, by the second drive device to the second drive axle, the second desired torque.

2. The method as claimed in claim 1, the method additionally comprising:
determining, from the first slip measured value and the second slip measured value, a ratio for the first drive axle and the second drive axle,
wherein the dividing, in dependence upon the first slip measured value and the second slip measured value, the total torque into a first desired torque and a second desired torque comprises dividing, in dependence upon the determined ratio value, the total torque into the first desired torque and the second desired torque.

3. The method as claimed in claim 1, the method additionally comprising:
determining a first slip threshold value for the first drive axle and a second slip threshold value for the second drive axle,
determining a radius of at least one wheel of the vehicle, and
determining, using the first slip measured value, the first slip threshold, and the radius, a first torque threshold for the first drive axle and determining, using the second slip measured value, the second slip threshold, and the radius, a second torque threshold for the second drive axle.

4. The method as claimed in claim 1, wherein the first desired torque is not greater than the first torque threshold for the first drive axle and wherein the second desired torque is not greater than the second torque threshold for the second drive axle.

5. The method as claimed in claim 1, wherein the first drive device is one of (i) a first axle drive device that acts upon the first axle or (ii) two first wheel drive devices that act independently of one another on wheels of the first axle, and
wherein the second drive device is one of (i) a second axle drive device that acts upon the second axle or (ii) two second wheel drive devices that act independently of one another on wheels of the second axle.

6. The method as claimed in claim 5, wherein at least one of the first axle drive device and the second axle drive device and/or at least one of the two first wheel drive devices and the two second wheel drive devices is an electric motor.

7. The method as claimed in claim 1, wherein the first drive device is configured to apply both acceleration and deceleration torques to the first drive axle and/or the second drive device is configured to effect both acceleration torques and deceleration torques to the second drive axle.

8. The method as claimed in claim 1, wherein the vehicle comprises an electronically regulated air suspension for ascertaining an axle load distribution.

9. The method as claimed in claim 1, wherein the method is implemented prior to commencing travel and/or during the driving operation of the vehicle.

10. The method as claimed in claim 1, wherein the method is repeated during the driving operation of the vehicle.

11. The method as claimed in claim 1, wherein the vehicle is one of a hybrid vehicle or a fully electric vehicle.

12. The method as claimed in claim 1, the method additionally comprising:
ascertaining a first maximum torque that can be implemented by the first drive device and a second maximum torque that can be implemented by the second drive device.

13. The method as claimed in any claim 1, wherein the vehicle additionally includes one or more further non-driven axles.

14. The method as claimed in claim 1, wherein the total torque is determined by one or more of a braking value encoder, a gas pedal of the vehicle, an external demand for acceleration or deceleration, or a manual operating element.

15. The method as claimed in claim 1, wherein the vehicle includes an electronically regulated air suspension configured to ascertain an axle load distribution of a first axle load value for the first drive axle and a second axle load value for the second drive axle.

16. The method as claimed in claim 1, wherein the first slip value and the second slip value indicate an amount of slip per rotation of a wheel of the vehicle, and
wherein the first slip measured value and the second slip measured value indicate a change in an amount of slip per rotation of a wheel in relation to a change in drive force applied to an axle.

17. A system for controlling a vehicle having first drive axle and a second drive axle, the device comprising:
a sensor configured to ascertain the first drive force that acts upon the first drive axle and a second drive force that acts upon the second drive axle;
a sensor configured to ascertain a first slip value for the first drive axle and a second slip value for the second drive axle;
an evaluator configured to determine, from the first drive force and the first slip value, a first slip measured value for the first drive axle and to determine, from the second drive force and the second slip value, a second slip measured value for the second drive axle;
a measurement device for determining a total torque that is to act altogether on the first drive axle and the second drive axle;
a controller configured to divide, in dependence upon the first slip measured value and the second slip measured value, the total torque into a first desired torque and a second desired torque;
a first drive device configured to apply the first desired torque to the first drive axle; and
a second drive device configured to apply the second desired torque to the second drive axle.

18. A vehicle including a system for controlling a vehicle as claimed in claim 17.

* * * * *